(12) United States Patent
Yoshimi et al.

(10) Patent No.: US 8,454,179 B2
(45) Date of Patent: Jun. 4, 2013

(54) VIDEO IMAGE APPRECIATION SYSTEM

(75) Inventors: Hiroyuki Yoshimi, Ibaraki (JP);
Kentarou Takeda, Ibaraki (JP);
Tomohito Takita, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 537 days.

(21) Appl. No.: 12/751,822

(22) Filed: Mar. 31, 2010

(65) Prior Publication Data

US 2010/0254114 A1 Oct. 7, 2010

(30) Foreign Application Priority Data

Apr. 6, 2009 (JP) ................................. 2009-091705

(51) Int. Cl.
*G02F 1/1335* (2006.01)
*F21V 9/14* (2006.01)
*G02B 27/28* (2006.01)

(52) U.S. Cl.
USPC ................................ 362/19; 313/112; 349/62

(58) Field of Classification Search
USPC ...... 362/19, 606, 607, 611, 615–620; 349/62, 349/96; 359/488.01
See application file for complete search history.

(56) References Cited

U.S. PATENT DOCUMENTS

| | | | |
|---|---|---|---|
| 6,096,375 A | 8/2000 | Ouderkirk et al. | |
| 6,583,833 B1 * | 6/2003 | Kashima | 349/98 |
| 6,822,711 B1 * | 11/2004 | Yoshida et al. | 349/115 |
| 2003/0206348 A1 * | 11/2003 | Hayashi | 359/485 |
| 2004/0095531 A1 * | 5/2004 | Jiang et al. | 349/115 |
| 2004/0189167 A1 * | 9/2004 | Adachi et al. | 313/112 |
| 2004/0218505 A1 * | 11/2004 | Hayashi | 369/112.16 |
| 2005/0030447 A1 * | 2/2005 | Hsu et al. | 349/102 |
| 2005/0151896 A1 * | 7/2005 | Hara et al. | 349/96 |
| 2007/0159701 A1 * | 7/2007 | Campbell et al. | 359/676 |
| 2007/0242200 A1 * | 10/2007 | Shibazaki | 349/120 |
| 2008/0143253 A1 * | 6/2008 | Adachi et al. | 313/504 |
| 2008/0171858 A1 | 7/2008 | Nagata et al. | |
| 2009/0015761 A1 * | 1/2009 | Stockham | 349/96 |
| 2009/0034070 A1 * | 2/2009 | Hara et al. | 359/487 |
| 2010/0284075 A1 * | 11/2010 | Yoshimi et al. | 359/493 |
| 2011/0037922 A1 * | 2/2011 | O'Neill et al. | 349/62 |

FOREIGN PATENT DOCUMENTS

| | | |
|---|---|---|
| JP | 8-271731 A | 10/1996 |
| JP | 9-127885 A | 5/1997 |
| JP | 9-507308 A1 | 7/1997 |
| JP | 2004-107542 A | 4/2004 |
| JP | 2005-97240 A | 4/2005 |

* cited by examiner

*Primary Examiner* — Karabi Guharay
(74) *Attorney, Agent, or Firm* — Westerman, Hattori, Daniels & Adrian, LLP

(57) ABSTRACT

A video image appreciation system 10 of the present invention comprises: a self-luminous display 30; and a circularly-polarized light source 11, wherein the self-luminous display 30 comprises in order: (a) a first wavelength plate 13 having functions to convert circularly-polarized light into linearly-polarized light and vice versa; (b) a polarizing film 15; (c) a linearly-polarized separation film 20; (d) a second wavelength plate 18 having functions to convert circularly-polarized light into linearly-polarized light and vice versa; and (e) a self-luminous panel 16.

2 Claims, 4 Drawing Sheets

VIDEO IMAGE APPRECIATION SYSTEM

BACKGROUND OF THE INVENTION

1. Field of the Invention

The present invention relates to a video image appreciation system with a self-luminous display and a circularly polarizing light source mounted outside the self-luminous display.

2. Description of Related Art

Conventionally, self-luminous displays in which polarizing films, quarter wavelength plates, and self-luminous panels are disposed in order are known as self-luminous displays with antireflection functions (For example, Japanese Unexamined Patent Publication No. 1997-127885 A).

FIG. 4 shows one example of a conventional self-luminous display 40.

(1) Natural light 42 emitted from a natural light source 41 passes through a polarizing film 43 and is converted into linearly-polarized light 44. The direction of the vibrating surface of the linearly-polarized light 44 is a transmission axis direction 43a of the polarizing film 43.

(2) The linearly-polarized light 44 passes through a quarter wavelength plate 45 to be converted into circularly-polarized light 46.

(3) The circularly-polarized light 46 reflects on a surface of a self-luminous panel 47 to convert its rotation direction into reverse circularly-polarized light 48 (For instance, if the circularly-polarized light 46 is clockwise circularly-polarized light before reflecting, the circularly-polarized light becomes counter-clockwise circularly-polarized light after reflecting).

(4) The circularly-polarized light 48 after the reflection passes through the quarter wavelength plate 45 to be converted into linearly-polarized light 49. The direction of the linearly-polarized light 49 is an absorption axis direction 43b of the polarizing film 43.

(5) Since the linearly-polarized light 49 is absorbed into the polarizing film 43, outside light having reflected on the surface of the self-luminous panel 47 does not reach an observer 50.

(6) On the other hand, displayed light 51 (video image) emitted from the self-luminous panel 47 is natural light, so that the displayed light 51 is turned into natural light 52 being unchanged to be incident on the polarizing film 43 without any influence of the quarter wavelength plate 45 and then is turned into linearly-polarized light 53 to reach the observer 50.

In this way, it is possible to increase a contrast in video images by inhibiting outside light reflection on the surface of the self-luminous panel 47.

However, in the conventional self-luminous display 40, when the displayed light 51 (video image) emitted from the self-luminous panel 47 passes through the polarizing film 43, about one half of the amount of light is absorbed into the polarizing film 43. This raises a problem of the dark display screen.

Further, it was necessary to make the room dark (reduce outside light) when appreciating high-definition video images because the conventional self-luminous display 40 does not have sufficient antireflection functions. Accordingly, video image appreciation systems with self-luminous displays capable of displaying high-definition and high contrast video images without the necessity of making the room dark have been demanded.

It is therefore an object of the present invention to provide a video image appreciation system with a self-luminous display which is capable of displaying high-definition and high contrast video images without making the room dark.

SUMMARY OF THE INVENTION

The gist of the present invention is as follows:

In a first preferred embodiment, a video image appreciation system according to the present invention comprises: a self-luminous display; and a circularly polarizing light source arranged outside the self-luminous display, wherein the self-luminous display comprises in order from the circularly polarizing light source: (a) a first wavelength plate having functions to convert circularly-polarized light into linearly-polarized light and vice versa; (b) a polarizing film; (c) a linearly-polarized separation film; (d) a second wavelength plate having functions to convert circularly-polarized light into linearly-polarized light and vice versa; and (e) a self-luminous panel.

In a second preferred embodiment of the video image appreciation system according to the present invention, the first and second wavelength plates are respectively a quarter wavelength plate.

FIG. 1 schematically shows a video image appreciation system 10 of the present invention.

(1) Circularly-polarized light 12 emitted from a circularly polarizing light source 11 is converted into linearly-polarized light 14 by a first wavelength plate 13.

(2) The linearly-polarized light 14 after having passed through the first wavelength plate 13 is absorbed at a polarizing film 15 because the vibrating surface of the linearly-polarized light 14 coincides with that of an absorption axis direction 15a of the polarizing film 15. Accordingly, light emitted from the circularly polarizing light source 11 does not reach a self-luminous panel 16. As a result, it is possible to reduce brightness in a bright place when displaying black images on the self-luminous panel 16 (Sharp black images can be displayed).

(3) On the other hand, displayed light 17 emitted from the self-luminous panel 16 is natural light, so that the displayed light 17 passes through a second wavelength plate 18 as it is and is still natural light 19 even after having passed through the second wavelength plate 18.

(4) The natural light 19 having passed through the second wavelength plate 18 is divided into two linearly-polarized light 21 and 22 at a linearly-polarized separation film 20.

(5) The linearly-polarized light 21 that is perpendicular to a reflection axis direction 20a of the linearly-polarized separation film 20 passes through the linearly-polarized separation film 20.

(6) The linearly-polarized light 21 having passed through the linearly-polarized separation film 20 is converted into linearly-polarized light 23 after having passed through the polarizing film 15 and then is converted into circularly-polarized light 24 after having passed through the first wavelength plate 13 to reach an observer 25.

(7) The linearly-polarized light 22 parallel to the reflection axis direction 20a of the linearly-polarized separation film 20 reflects at the linearly-polarized separation film 20.

(8) The linearly-polarized light 22 having reflected at the linearly-polarized separation film 20 is converted into circularly-polarized light 26 after passing through the second wavelength plate 18.

(9) The circularly-polarized light 26 having passed through the second wavelength plate 18 reflects again on the surface or inside the self-luminous panel 16. At this time, the direction of the circularly-polarized light reverses (For instance, the circularly-polarized light 26 is counter-clockwise circularly-polarized light before reflecting and becomes clockwise circularly-polarized light after reflecting).

(10) Circularly-polarized light 27 having reflected on the surface of the self-luminous panel 16 passes through again the second wavelength plate 18 (three times).

(11) At this time, although the circularly-polarized light 27 is converted into linearly-polarized light 28, the linearly-polarized light 28 passed through the linearly-polarized separation film 20 because the vibrating surface is different from the previous one by 90°.

(12) Linearly-polarized light 29 having passed through the linearly-polarized separation film 20 is converted into the linearly-polarized light 23 after passing through the polarizing film 15 and then is converted into the linearly-polarized light 24 after passing through the first wavelength plate 13 to reach the observer 25.

As mentioned above, the displayed light 17 emitted from the self-luminous panel 16 in theory completely reaches the observer 25 without being absorbed into the polarizing film 15, resulting in an increase in brightness when white images are displayed on the self-luminous panel 16 (Vivid images can be displayed).

Therefore, the video image appreciation system 10 of the present invention is capable of displaying high-definition video images without making the room dark because of a high contrast ratio in the bright place.

Advantage of the Invention

A self-luminous display of the video image appreciation system of the present invention is capable of displaying video images with high contrast and high definition, even under bright outside light. In particularly, the displayed brightness of the black images is lowered.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
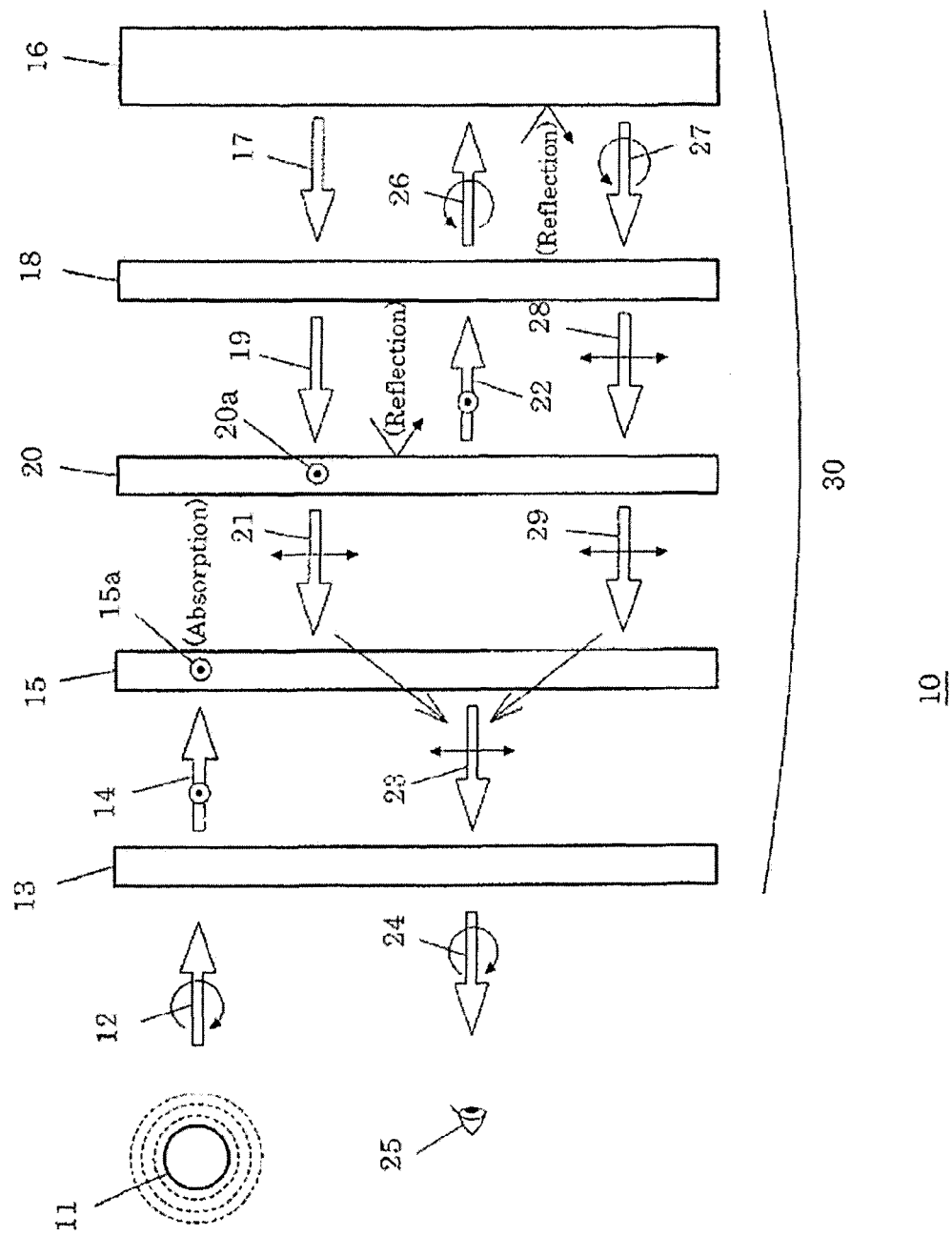
FIG. 1 is a schematic view of a video image appreciation system of the present invention.

The preferred embodiments of the present invention will now be described with reference to FIGS. 1-4 of the drawings. Identical elements in the various figures are designated with the same reference numerals.

[Video Image Appreciation System]

FIG. 1 schematically shows one example of a video image appreciation system 10 according to the present invention. As shown in FIG. 1, the video image appreciation system 10 comprises: a self-luminous display 30; and a circularly polarizing light source 11 arranged outside the self-luminous display 30.

The self-luminous display 30 comprises in order from the circularly-polarizing light source 11 side (from an observer 25 side): (a) a first wavelength plate 13 having functions to convert circularly-polarized light into linearly-polarized light and vice versa; (b) a polarizing film 15; (c) a linearly-polarized separation film 20; (d) a second wavelength plate 18 having functions to convert circularly-polarized light into linearly-polarized light and vice versa; and (e) a self-luminous panel 18.

The aforementioned first wavelength plate 13, the polarizing film 15, the linearly-polarized separation film 20, and the second wavelength plate 18 are usually laminated on the surface of the self-luminous panel 18 with an adhesive layer or the like.

[Circularly Polarizing Light Source]

The circularly polarizing light source 11 to be used in the present invention is not particularly limited, as long as the light source 11 emits circularly-polarized light. Circularly-polarized light emitted from the circularly polarizing light source 11 is clockwise circularly-polarized light or counter-clockwise circularly-polarized light, alternatively, both of them. When light emitted from the circularly polarizing light source 11 includes both clockwise circularly-polarized light and counter-clockwise circularly-polarized light, it is preferable that there is a difference in intensity between the clockwise and counter-clockwise circularly-polarized light.

The term "clockwise circularly-polarized light" herein means polarized light in which a trail of the electric field vector rotates in a clockwise direction when observing from a traverse direction of light and the term "counter-clockwise circularly-polarized light" herein means polarized light in which a trail of the electric field vector rotates in a counter-clockwise direction.

One of embodiments of the circularly polarizing light source 11 is illumination using a circularly polarizing dichroism light-emitting material. Examples of the circularly polarizing dichroism light-emitting material include liquid-crystalline conjugated polymer compounds with a helical structure (for example, JP 2004-107542 A) or rare-earth complexes (for example, JP 2005-97240 A) or the like.

In another embodiment of the circularly polarizing light source 11, a circularly polarized separation film is disposed on general illumination emitting natural light (light wherein the direction of the vibrating surface of the electric field vector is randomly distributed) or a window of a building, a vehicle, a train or an airplane and the like is incident.

An example of the circularly polarized separation film includes a cholesteric liquid crystalline layer described in JP 1996-271731 A, which preferentially reflects either one of clockwise and counter-clockwise circularly-polarized light and transmits the other circularly-polarized light.

[Self-Luminous Display]

The self-luminous display 30 to be used in the present invention comprises in order from the circularly polarizing light source 11 side:

(a) a first wavelength plate 13 having functions to convert circularly-polarized light into linearly-polarized light and vice versa;

(b) a polarizing film 15;

(c) a linearly-polarized separation film 20;

(d) a second wavelength plate 18 having functions to convert circularly-polarized light into linearly-polarized light and vice versa; and (e) a self-luminous panel 16.

Figure 2:
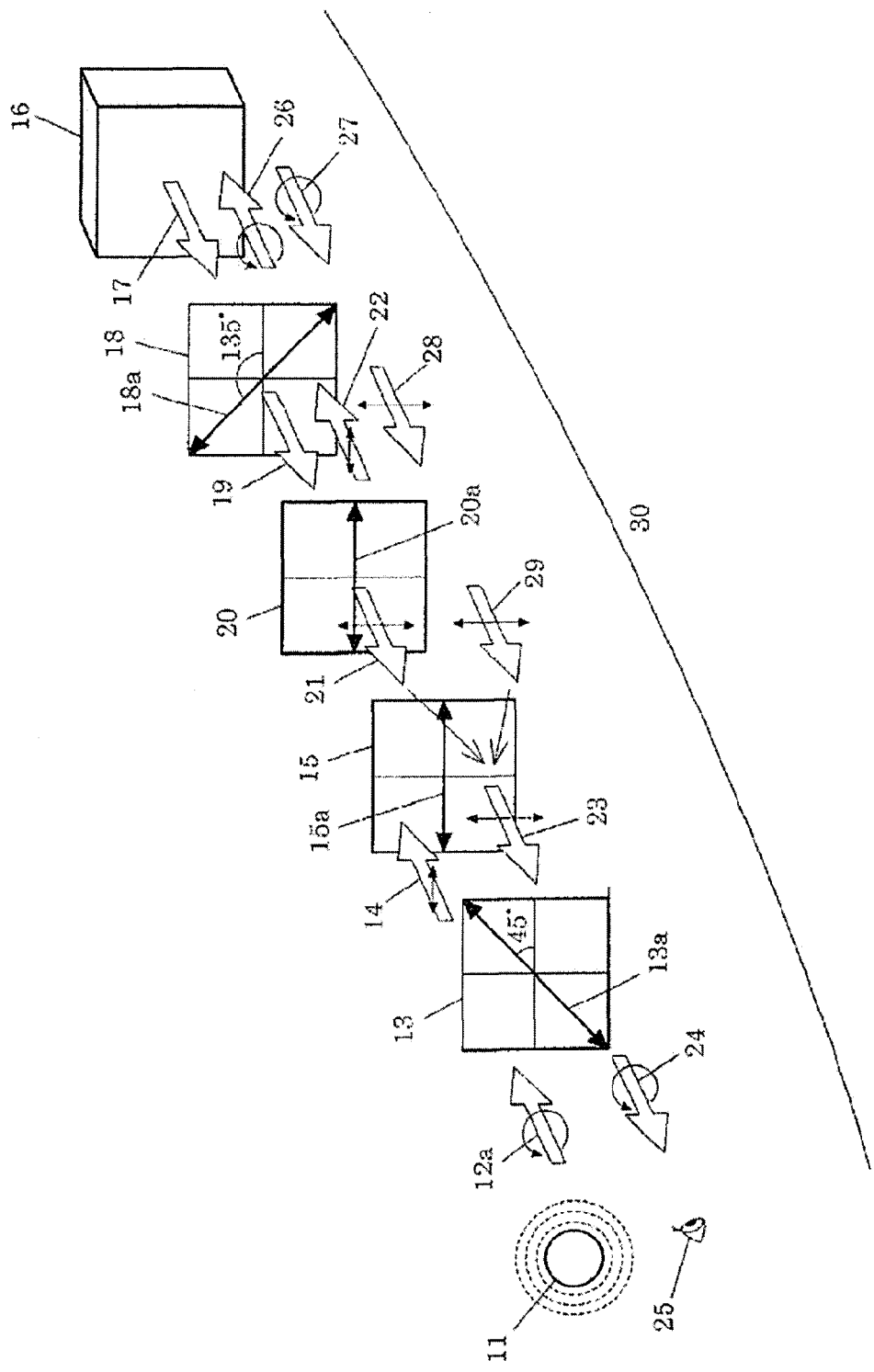
FIG. 2 is a schematic view of the video image appreciation system of the present invention.
Figure 3:
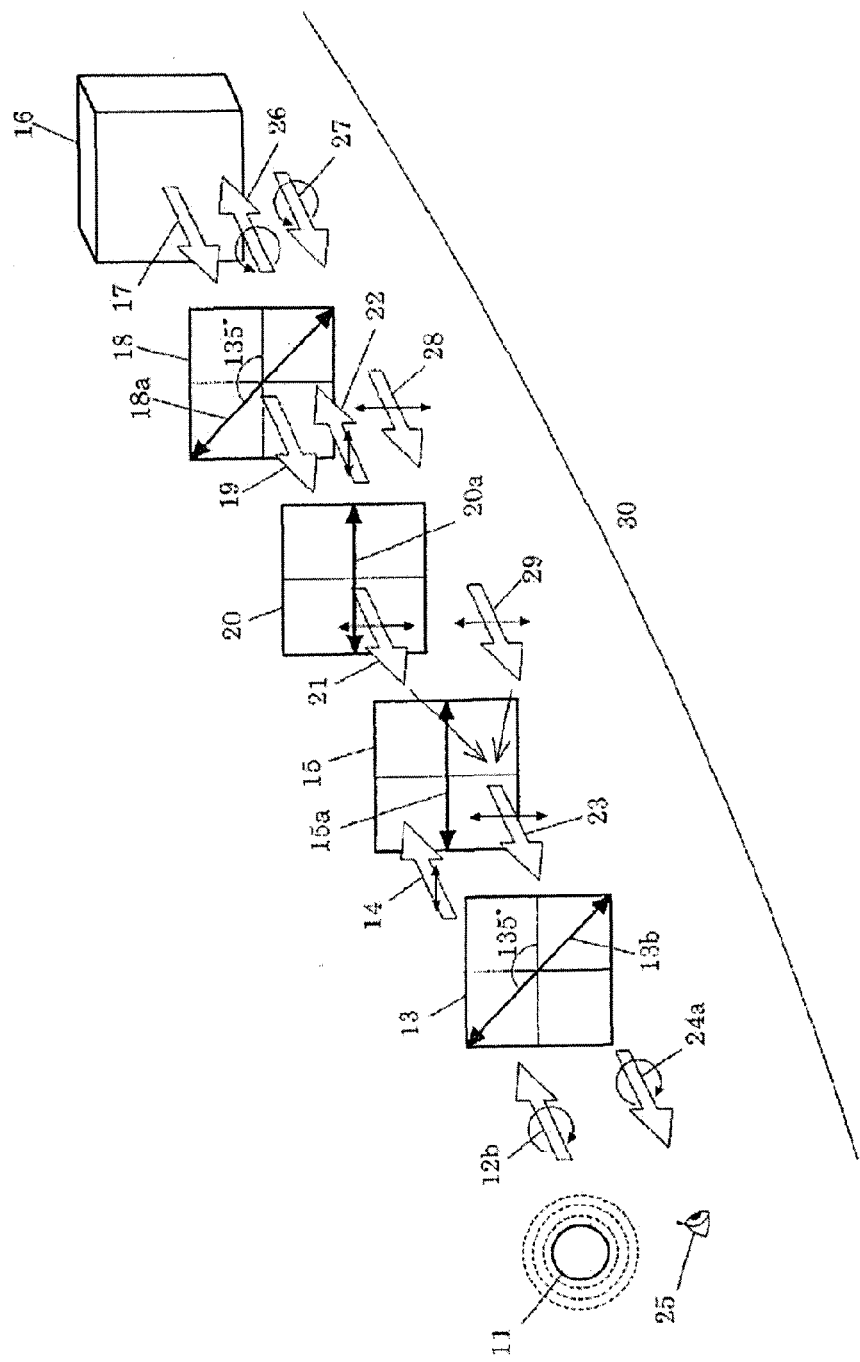
FIG. 3 is a schematic view of the video image appreciation system of the present invention.

The first wavelength plate 13 is arranged in such a manner that light emitted from the circularly polarizing light source 11 may be absorbed into the polarizing film 15. As shown in FIGS. 2 and 3, a lagging axis direction 13a of the first wavelength plate 13 is appropriately determined in accordance with the rotation direction of circularly-polarized light 12 emitted from the circularly polarizing light source 11. The term "lagging axis direction" herein means a direction in which the refractive index in a plane becomes a maximum.

As shown in FIG. 2, when counter-clockwise circularly-polarized light 12a is emitted from the circularly polarizing light source 11, the lagging axis direction 13a of the first wavelength plate 13 is preferably in the range of 45°±5° in counter-clockwise rotation on the basis of an absorption axis direction 15a of the polarizing film 15 when viewed from the circularly polarizing light source 11 side.

The second wavelength plate 18 is arranged in such a manner that light having passed through the second wavelength plate 18 from backward to forward may pass through the linearly-polarized separation film 20. A lagging axis direction 18a of the second wavelength plate 18 is preferably in the range of 135°±5° in counter-clockwise rotation (shown in figure) or in the range of 45°±5° (not shown in figure) in counter-clockwise rotation on the basis of a reflection axis direction 20a of the linearly-polarized separation film 20 when viewed from the circularly polarizing light source 11 side.

As shown in FIG. 3, when clockwise circularly-polarized light 12b is emitted from the circularly-polarized light source 11, a lagging axis direction 13b of the first wavelength 13 is preferably in the range of 135°±5° in counter-clockwise rotation on the basis of the absorption axis direction 15a of the polarizing film 15 when viewed from the circularly-polarized light source 11 side.

The second wavelength plate 18 is arranged in such a manner that light having passed through the second wavelength plate 18 from backward to forward may pass through the linearly-polarized separation film 20. The lagging axis direction 18a of the second wavelength plate 18 is preferably in the range of 135°±5° in counter-clockwise rotation (shown in figure) or in the range of 45°±5° (not shown in figure) in counter-clockwise rotation on the basis of the reflection axis direction 20a of the linearly-polarized separation film 20 when viewed from the circularly polarizing light source 11 side.

The linearly-polarized separation film 20 is arranged in such a manner that light having passed through the linearly-polarized separation film 20 from backward to forward may pass through the polarizing film 15. The reflection axis direction 20a of the linearly-polarized separation film 20 and the absorption axis direction 15a of the polarizing film 15 preferably correspond with each other in the range of ±5°.

[First and Second Wavelength Plates]

The first and second wavelength plates 13 and 18 to be used in the present invention respectively have functions to convert circularly-polarized light into linearly-polarized light and vice versa. The first wavelength plate 13 and the second wavelength plate 18 may be the same kind or different kinds.

It is preferable that the first and second wavelength plates 13 and 18 are respectively a quarter wavelength plate. The term "a quarter wavelength plate" herein means a plate whose in-plane phase difference at least one wavelength in the visible light region (at a wavelength of 380 to 780 nm) is a quarter wavelength. The in-plane phase difference of the quarter wavelength plate at a wavelength of 550 nm is preferably 120 to 160 nm.

The first and second wavelength plates 13 and 18 are typically formed by an extended polymer film and a coating layer of a liquid crystal compound. The first and second wavelength plates 13 and 18 may be a single layer or two or more layers of laminates.

[Polarizing Film]

The polarizing film 15 to be used in the present invention is an absorption-type linear polarizer for passing through one of polarizing components and absorbing the other polarization component when breaking incident light into polarization components having vibrating surfaces with two directions perpendicular to each other. The polarizing film 15 is, for example, made by extending a polyvinyl alcohol film and is dyed with iodine. In such polarizing film 15, a (poly) iodine ion complex in a polyvinyl alcohol film is formed and the alignment of the (poly) iodine ion complex in one direction leads to develop absorption dichroism.

In the present invention, a polarizing film available in the market (a film is sandwiched by transparent protective films) may be used as the polarizing film 15.

[Linearly-Polarized Separation Film]

At the time when incident light is broken into polarization components having vibrating surfaces with two directions perpendicular to each other, the linearly-polarized separation film 20 to be used in the present invention passes through one of the polarization components and reflects the other polarization component.

For example, an extended film formed by alternatively laminating a plurality of polyethylene naphthalate layers, as described in JP 1997-507308 A and naphthalene carbonic acid and copolyester layers of telephthalic acid may be used. Alternatively, a brightness enhancement film available in the market (DBEF manufactured by 3M) may be used.

Out of two kinds of layers alternatively and multiply laminated in the linearly-polarized separation film 20, there are a direction (a transmission axis direction) where the refractive index of one layer is in accordance with that of the other layer and a different direction (reflection axis direction). While linearly-polarized light in the direction in which the refractive index corresponds to each other passes through, the linearly-polarized light in the different direction reflects.

[Self-Luminous Panel]

A cathode-ray tube, any panels, such as a plasma display panel, an electroluminescent (EL) panel, and a field emission (FE) panel or the like may be used as the self-luminous panel 16.

EXAMPLES

Example

The following was arranged on a surface of an organic EL panel equipped with a cell phone (W52K manufactured by Kyocera Corporation) in the position shown in FIG. 3 to make a self-luminous display:
(a) a quarter wavelength plate (NZF manufactured by Nitto Denko Corporation, in-plane phase difference at a wavelength of 590 nm=140 nm);
(b) a polarizing plate (NPFSEG1224DU manufactured by Nitto Denko Corporation);
(c) a linearly-polarized separation film (DBEF manufactured by 3M); and
(d) a quarter wavelength plate (NZF manufactured by Nitto Denko Corporation, in-plane phase difference at a wavelength=140 nm).

A circularly-polarized light source was arranged in a position 60 cm away from the observer side from the surface of the self-luminous display to make a video image appreciation system as configured in FIG. 3.

A fluorescent lamp for a desk lamp available in the market (Love eye Inverter manufactured by Panasonic Electric Works Co., Ltd.) on which a circularly-polarized separation film made of a cholesteric liquid crystal layer (a film in which a quarter wavelength plate was removed from PCF400 manufactured by Nitto Denko Corporation) was attached to was used as a circularly-polarized light source.

Black images and white images were displayed on the self-luminous display of the video image appreciation system to measure brightness.

Comparative Example 1

Figure 4:
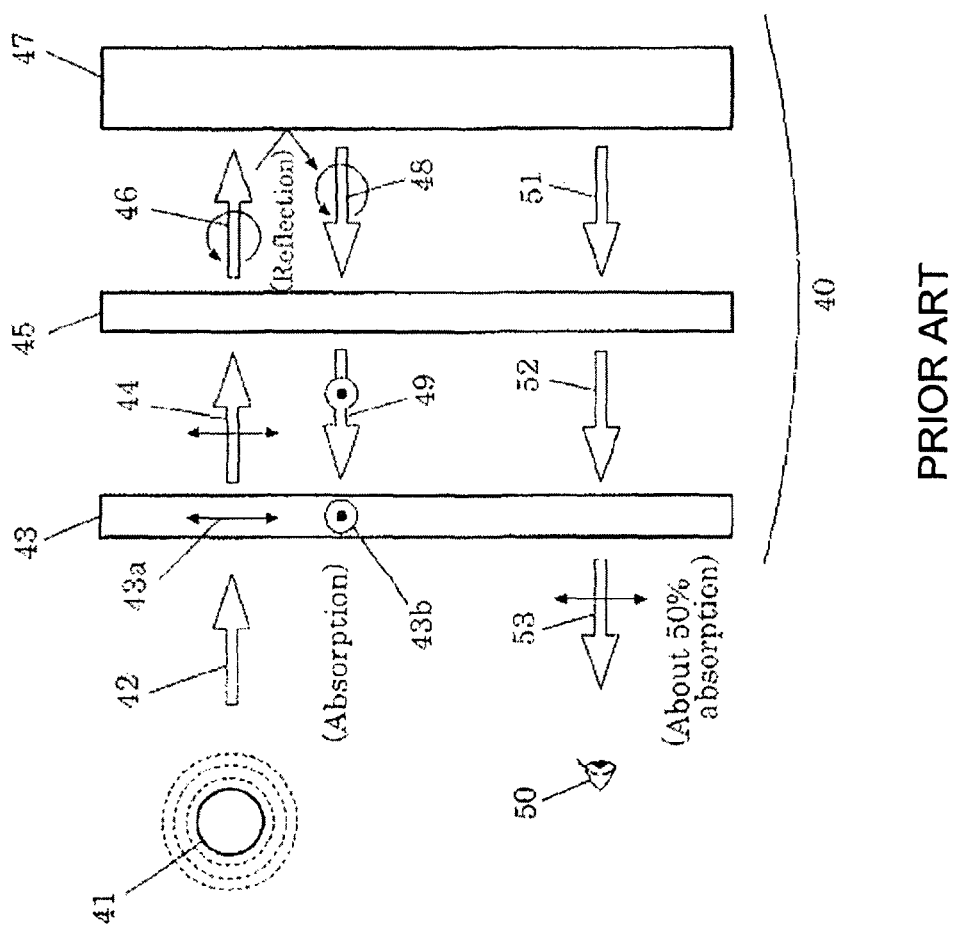
FIG. 4 is a schematic view of a conventional self-luminous display.

The following was arranged on a surface of an organic EL panel equipped with a cell phone (W52K manufactured by Kyocera Corporation) in the position shown in FIG. 4 to make a self-luminous display:
(a) a polarizing plate (NPFSEG1224DU manufactured by Nitto Denko Corporation); and
(b) a quarter wavelength plate (NZF manufactured by Nitto Denko Corporation, in-plane phase difference at a wavelength of 590 nm=140 nm).

A natural light source with the same illuminance as Example was arranged in a position 60 cm away from the observer side from the surface of the self-luminous display to make a video image appreciation system as configured in FIG. 4.

A fluorescent lamp of a desk lamp available in the market (Love eye Inverter manufactured by Panasonic Electric Works co., Ltd.) was used as the natural light source.

Black images and white images were displayed on the self-luminous display of the video image appreciation system to measure brightness. Table 1 shows the measurement result.

Comparative Example 2

The polarizing plate and the quarter wavelength plate arranged on the surface of the organic EL panel were removed from the self-luminous display in Comparative Example 1 to allow the self-luminous panel to remain. Black images and white images were displayed on the self-luminous display to measure brightness under the same conditions as the Comparative Example 1. Table 1 shows the measurement result.

TABLE 1

| | Black brightness ($cd/m^2$) | White brightness ($cd/m^2$) | Contrast ratio |
|---|---|---|---|
| Example | 2.0 | 305.7 | 152.9 |
| Comparative Example 1 | 2.3 | 157.5 | 68.5 |
| Comparative Example 2 | 5.8 | 351.2 | 60.6 |

[Evaluation]

As is clear from Table 1, the self-luminous display in the Example (Video image appreciation system of the present invention) has a high contrast ratio, which leads to display high-definition video images.

[Measuring Method]

[Black Brightness, White Brightness, Contrast Ratio]

Images were displayed on the display screen to measure brightness under the conditions that the measurement distance is 1 m and the viewing angle is 1° using a luminance meter (BM-5 manufactured by TOPCON CORPORATION). Black brightness is brightness in the case of displaying black images and white brightness is brightness in the case of displaying white images. The contrast ratio was obtained by white brightness/black brightness.

[In-Plane Phase Difference]

The in-plane phase difference was measured using an in-plane difference measurement device (KOBRA21ADH manufactured by Oji Scientific Instruments).

[Industrial Applicability]

The video image appreciation system of the present invention is suitable for appreciating video images of a self-luminous display under a bright environment. While the contrast of the self-luminous display is usually deteriorated under such an environment due to outside light, resulting in extreme degradation in quality of video images, the video image appreciation system of the present invention is capable of taking high-definition video images without a decline in contrast.

This application claims priority from Japanese Patent Application No. 2009-091705, which is incorporated herein by reference.

There has thus been shown and described a novel video image appreciation system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:
1. A video image appreciation system comprising:
a self-luminous display; and
a circularly polarizing light source arranged outside the self-luminous display,
wherein the self-luminous display comprises in order from the circularly polarizing light source:
(a) a first wavelength plate having functions to convert circularly-polarized light into linearly-polarized light and vice versa;
(b) a polarizing film;
(c) a linearly-polarized separation film;
(d) a second wavelength plate having functions to convert circularly-polarized light into linearly-polarized light and vice versa; and
(e) a self-luminous panel.
2. The video image appreciation system according to claim 1, wherein the first and second wavelength plates are respectively a quarter wavelength plate.

* * * * *